(12) United States Patent
Loce et al.

(10) Patent No.: US 6,332,044 B1
(45) Date of Patent: Dec. 18, 2001

(54) SYSTEM AND METHOD FOR ENHANCEMENT OF IMAGE CONTOUR FIDELITY

(75) Inventors: Robert P. Loce, Webster; Michael Branciforte, Rochester, both of NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 08/784,636

(22) Filed: Jan. 21, 1997

(51) Int. Cl.[7] .............. G06K 9/40; G06K 9/56; G06K 9/62
(52) U.S. Cl. ............ 382/269; 382/205; 382/209
(58) Field of Search .................... 382/205, 209, 382/266, 267, 268, 269, 112, 216–217

(56) References Cited

U.S. PATENT DOCUMENTS

| 4,437,122 |   | 3/1984  | Walsh et al. ............... 358/166 |
| 4,847,641 | * | 7/1989  | Tung ........................ 346/154 |
| 5,249,242 | * | 9/1993  | Hanson et al. ............... 382/54 |
| 5,329,599 | * | 7/1994  | Curry et al. ................. 382/54 |
| 5,359,423 | * | 10/1994 | Loce et al. ................. 358/296 |
| 5,365,251 | * | 11/1994 | Denber ...................... 345/136 |
| 5,383,036 | * | 1/1995  | Mailloux et al. ............ 358/518 |
| 5,387,985 | * | 2/1995  | Loce et al. ................. 358/447 |
| 5,479,584 | * | 12/1995 | Curry ........................ 395/102 |
| 5,483,605 | * | 1/1996  | Rostamian ................. 382/181 |
| 5,561,721 | * | 10/1996 | Mutz ........................ 382/205 |
| 5,579,445 | * | 11/1996 | Loce et al. ................. 395/102 |
| 5,680,485 | * | 10/1997 | Loce et al. ................. 382/257 |
| 5,687,297 | * | 11/1997 | Coonan et al. ............. 382/209 |
| 5,696,845 | * | 12/1997 | Loce et al. ................. 382/254 |
| 5,862,266 | * | 1/1999  | Hunter ...................... 382/266 |
| 5,862,305 | * | 1/1999  | Girmay et al. ............. 395/102 |

OTHER PUBLICATIONS

European Search Report for Patent Application No. 98300400.3.

* cited by examiner

Primary Examiner—Amelia M. Au
Assistant Examiner—Martin Miller
(74) Attorney, Agent, or Firm—Duane C. Basch; Philip E. Blair

(57) ABSTRACT

The present invention is a method and apparatus for performing filtering operations on a digital image. One embodiment is enhancement of the contour fidelity of the image represented by a plurality of pixels, by storing pixel values representing a segment of the image in memory; isolating a plurality of regions of the pixels of said image segment to form a plurality of windows including a central pixel and a plurality of pixels surrounding said central pixel. Then comparing at least two of the regions of pixels within the windows with a set of standard pixel patterns for each of the windows and identifying matching pixel patterns within each of the windows. When matching patterns are identified, enhancing one or more pixels located at a correctable position when the central pixel is located at a correctable position in a plurality of the windows wherein the enhancement is accomplished in accordance with an enhancement associated with one of the windows and wherein the enhancement is determined in accordance with a predetermined hierarchy for the windows.

9 Claims, 6 Drawing Sheets

SYSTEM AND METHOD FOR ENHANCEMENT OF IMAGE CONTOUR FIDELITY

This invention relates generally to hierarchically organized filters for processing digital images, and more particularly to the use of hierarchically organized template-matching filters to accomplish the resolution enhancement in a cost and computationally efficient manner.

BACKGROUND AND SUMMARY OF THE INVENTION

Others have proposed template matching techniques for more precisely controlling the size, positioning and number of picture elements ("pixels") that are exposed on a xerographic photoreceptor to render bitmapped images. Heretofore, a number of patents and publications have disclosed resolution enhancement, and hierarchical template-matching, the relevant portions of which may be briefly summarized as follows:

For example, U.S. Pat. No. 4,437,122 to Walsh et al. describes a method of resolution enhancement for a system receiving video display pixel information and providing hard copy output. Enhancement is achieved by storing successive lines of video data in parallel shift registers, applying the output of the shift registers to a decoder, and generating driving signals for a printer head. The decoder "compares tile pixels on the same lines as well as in preceding and succeeding lines that surround each specific input pixel to generate the printer head driving signal according to whether straight or curved line segments are to be formed" (col. 2, lines 6–10). Moreover, enhancement of the central pixel may be determined by "progressively examining an ordered table of matches to find an equivalent image and its related enhancement" (col. 3, line 67-col. 4, line 1).

U.S. Pat. No. 4,847,641 to Tung teaches enhancing the printing of bitmapped images by the piecewise matching of the bitmap with predetermined stored templates of patterns to detect the occurrence of preselected bitmap features. Templates representing compound error elements common to all bitmap images, associated compensation signals for each template, and the rules governing the relationships between the matched templates and the associated compensation signals are compiled into an index matching table implemented in a high speed parallel logic array.

U.S. Pat. No. 5,365,251 to Denber discloses hierarchical pattern matching with variable size templates. A pattern matching template is partitioned into a set of smaller sub-templates, the sub-templates located in the corner units are discarded, and the remaining sub-templates are checked to determine whether the output image in each remaining sub-template is defined as anything other than all-white or all-black. If the output image in each sub-template is so defined, the sub-template is checked with a matching region. The matching region defines an action to be taken on the central pixel and pattern-matching is then performed within the area.

U.S. Pat. No. 5,329,599 to Curry teaches the enhancement of fidelity in reproduced images by hierarchical template matching. The method for enhancing the contour fidelity of images includes isolating a window of pixels in a portion of the image and comparing pixels in the window with a hierarchical set of standard pixel patterns that include correctable pixel positions. Matching patterns are identified, and the central pixel of the window is enhanced when it lies in a correctable position in the highest priority pattern that is matched.

The present invention is adaptable to apply template matching in any system that utilizes multiple patterns in a matching algorithm. Some common applications include enhancement of digital documents, resolution conversion and enhancement of digital documents, image restoration for aesthetic purposes, or human and machine recognition (e.g., OCR, and other feature recognition). Template matching has been effectively employed to overcome some of the sampling errors that are caused by the use of input data that is too coarse to accurately represent the higher spatial frequency content of an image. Note that coarseness refers to sampling in a manner that does not fully represent the information content of the image, which includes coarse spatial sampling (e.g., spots per inch), and coarse quantization (e.g., 1 bit/pixel compared to 8 bits/pixel).

A specific application in which the present invention finds particular use is enhancement of images for electronic printing. In electronic printing, digital character features are often recognized and based upon the recognition and capability of the image writing member, various types of enhanced pixel signals are generated and used to write the final printed or displayed image. Types of enhanced signals include increased quantization range (conversion of binary signal to gray-scale, which is commonly referred to as antialiasing), high addressable signals that control the writing spot over distances smaller than the spot itself, and pulse controlled signals that may activate the writing member (e.g., laser) some preferred length of time that may be shorter than a nominal pixel period.

High-addressability printers operate by scanning one or more intensity modulated scan spots over a high gamma, photosensitive recording medium in accordance with a scan pattern that causes the spot or spots to superimpose displaced multiple discrete exposures on the recording medium. High addressability typically refers to the ability to address the image writing member (e.g., laser) in spatial increments finer than the size of the writing spot, or nominal resolution of the imaging system. High addressability systems have substantially linear edge position responses, so that pixel signals modulated in accordance with the preselected values are used by these systems for spatially positioning the transitions that are contained by the images they render to a sub-pitch (smaller than the writing spot) precision. It is well known that the human visual system is particularly sensitive to jagged edge transitions in image patterns, where this sensitivity is referred to as vernier acuity. The degree of edge placement precision enabled by high addressability aids in suppressing the appearance of jagged image artifacts caused by the coarse sampling.

In accordance with the present invention, there is provided a method of enhancing the contour fidelity of reproduction of an image represented by a plurality of pixels, comprising the steps of:

storing pixel values representing a segment of the image in memory;

isolating a plurality of regions of the pixels of said image segment to form a plurality of windows, each window being of different dimensions while including a common central pixel and a plurality of pixels surrounding said central pixel;

comparing at least two of the regions of pixels within the windows with a set of standard pixel patterns for each of the windows;

identifying matching pixel patterns within each of the windows; and enhancing the central pixel when the central pixel is located at a correctable position in only one of the windows, and enhancing the central pixel when the central pixel is located at a correctable position in a plurality of the windows wherein the enhancement is accomplished in accordance with an enhancement associated with one of the windows and wherein the enhancement is determined in accordance with a predetermined hierarchy for the windows.

Note that while the filter windows have been described as having a common central pixel, it is understood by those skilled in the art that the concepts are immediately extendible to windows that contain a plurality of common pixels. Use of multiple common pixels in window mapping is referred to as area mapping. See "AREA MAPPING EMPLOYING REFERENCE CLUSTERS FOR HIGH QUALITY NONINTEGER RESOLUTION CONVERSION WITH ENHANCEMENT" by Loce et al., Application Ser. No. 08/451,376, hereby incorporated by reference, for a description of an area mapping method that may employ the present invention.

In accordance with another aspect of the present invention, there is provided an apparatus for enhancing the contour fidelity of reproduction of an image represented by a plurality of pixels, comprising:

memory for storing pixel values representing a segment of the image;
  a plurality of windows for isolating a plurality of regions of the pixels of said image segment, each window being of different dimensions while including a central pixel and a plurality of pixels surrounding said central pixel;
  pattern matchers for comparing at least two of the regions of pixels within the windows with a set of standard pixel patterns for each of the windows and signaling the presence of matching pixel patterns within each of the windows; and
  said pattern matchers enhancing at least one output pixel when the output pixel is located at a correctable position in only one of the windows, and enhancing the output pixel when the output pixel is located at a correctable position in a plurality of the windows wherein the enhancement is accomplished in accordance with an enhancement associated with one of the windows and wherein the enhancement is determined in accordance with a predetermined hierarchy for the windows.

One aspect of the invention is based on the recognition of a problem with conventional and high addressability printing utilized to render enhanced exposure fidelity to a photoreceptor or other recording media. Normally the source of the high fidelity information is a sampled image or a high resolution bitmap. But many raster data sources provide low resolution bitmaps at 300 or 400 bits per inch, which is not enough resolution to eliminate unwanted artifacts induced by the coarseness of the information, such as stairstepping. While resolution enhancement to improve such renderings is known, the present invention is directed to a computationally and costeffective manner to achieve template-matching.

The hierarchical design of the invention has the advantage of simplifying and thereby reducing the cost and complexity of the implementation. Pattern templates are implemented in a set of hierarchical windows, in which the more specific pattern that receives a match has priority over the smaller, more general patterns. Moreover, the patterns are arranged in accordance with the pattern size so as to reduce the storage necessary to implement the very specific patterns.

The technique described above is advantageous because it efficiently reduces the storage requirements of a template-based resolution enhancement system while maintaining the ability to recognize very specific template patterns. As a result of the invention, resolution enhancement using hierarchical template-matching techniques may be accomplished with reduced template pattern storage.

Figure 1:
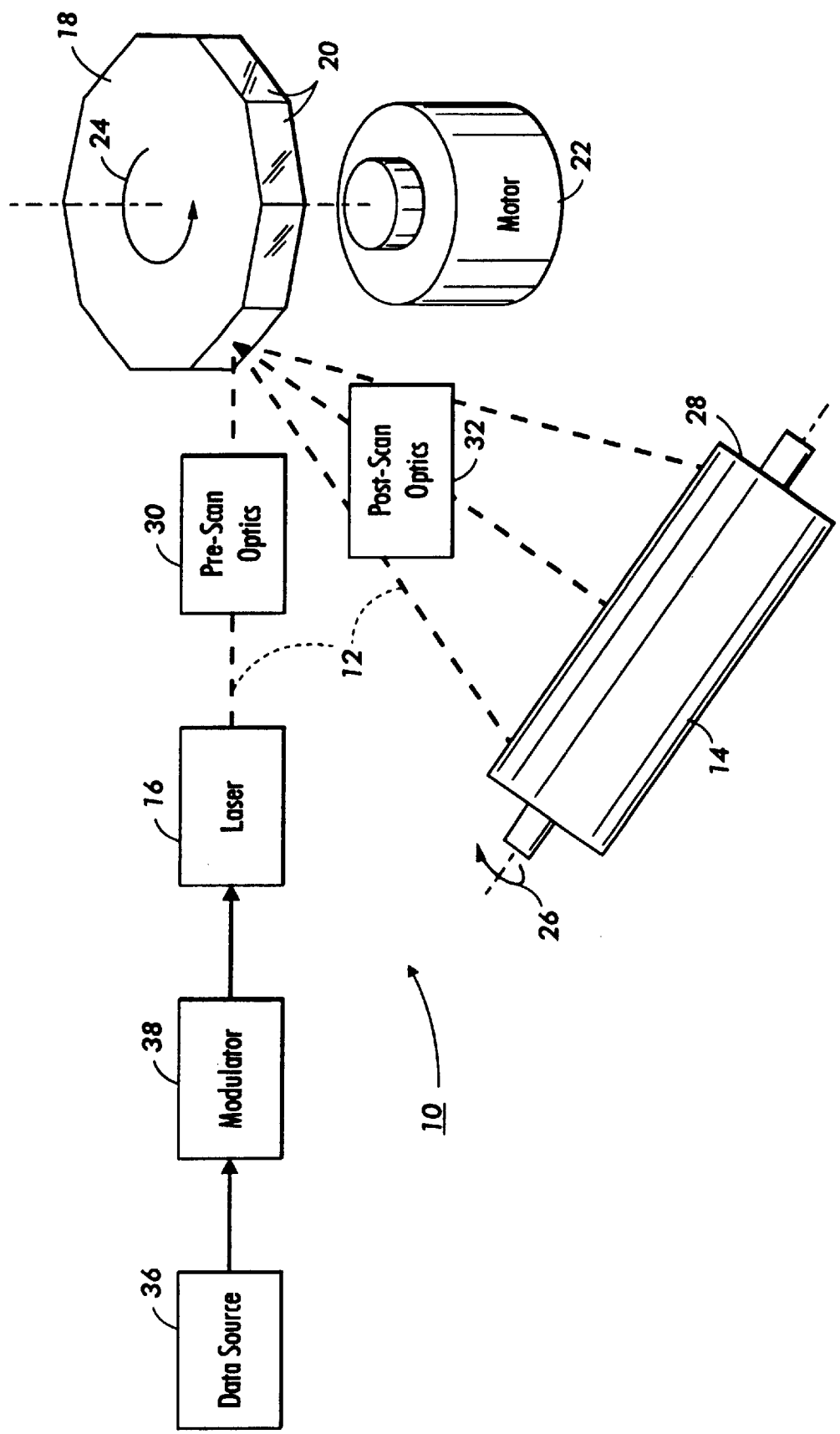
FIG. 1 is an illustration of the general features of a laser printer.

The present invention is described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

An "image" is a pattern of physical light. An image may include characters, words, and text as well as other features such as graphics, including pictures. An image may be divided into "segments," each of which is itself an image. A segment of an image may be of any size up to and including the whole image.

An item of data "defines" an image when the item of data includes sufficient information to produce the image. For example, a two-dimensional array can define all or any part of an image, with each item of data in the array providing a value indicating the color of a respective location of the image.

Each location in an image may be called a "pixel." In an array defining an image in which each item of data provides a value, each value indicating the color of a location may be called a "pixel value". Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. A "central pixel" is not literally the center pixel in a region, rather the term describes a target pixel that a plurality of template windows have in common. It will be appreciated that many or all of the pixels become the "central" or "target" pixel during the process of enhancing an entire image.

A "high-addressability" pixel is a pixel for which the location and size of the mark to be rendered for the pixel can be controlled at a resolution higher than the pixel resolution. For example, a high-addressability pixel may be represented by a plurality of sub-pixels therein, where each subpixel may be rendered as black or white (color, no color). It will be appreciated by those skilled in the art that other methods of accomplishing high-addressability output may be dependent upon the marking engine employed, and that high-addressability is not necessarily limited to sub-pixel imaging techniques. "Resolution enhancement" is a process by which the pixels of an image are processed to produce either more pixels for the same spatial region or the same number of high-addressability pixels.

An item of data "relates to" part of an image, such as a pixel or a larger segment of the image, when the item of data has a relationship of any kind to the part of the image. For example, the item of data could define the part of the image, as a pixel value defines a pixel; the item of data could be obtained from data defining the part of the image; the item of data could indicate a location of the part of the image; or the item of data could be part of a data array such that, when the data array is mapped onto the image, the item of data maps onto the part of the image.

An operation performs "image processing" when it operates on an item of data that relates to part of an image.

A "neighborhood operation" is an image processing operation that uses data relating to one part of an image to obtain data relating to another part of an image.

Pixels are "neighbors" or "neighboring" within an image when there are no other pixels between them or if they meet an appropriate criterion for neighboring. For example, using a connectivity criterion if the pixels are rectangular and appear in rows and columns, each pixel has 4 strong neighbors, 4 weak neighbors or a total of 8 neighboring pixels.

A "version" of a first image is a second image produced using an item of data defining the first image. The second image may be identical to the first image, or it may be modified by loss of resolution, by changing the data defining the first image, or by other processes that result in a modified version.

An "image input device" is a device that can receive an image and provide an item or items of data defining a version of the image. A desktop "scanner" is an example of an image input device that receives an image by a scanning operation, such as by scanning a document.

An "image output device" is a device that can receive an item of data defining an image and provide the image as output. A "display" and a "laser printer" are examples of image output devices that provides the output image in human viewable form. The visible pattern presented by a display is a "displayed image" or simply "image" while the visual pattern rendered on a substrate by the printer is a "printed image".

"Raster output scanners" (ROSs), a type of image output device developed for xerographic printing, employ a single beam or a multi-beam laser light source for supplying one or more intensity modulated light beams, together with a scanner (such as polygon scanner) for cyclically deflecting the modulated laser beam or beams across a photoreceptor in a "fast scan direction" while the photoreceptor is being advanced simultaneously in an orthogonal "process direction." In practice, each of the laser beams typically is brought to focus on or near the photoreceptor surface to provide a substantially focused "scan spot." The scan spot, in turn, scans the photoreceptor in accordance with a pre-determined scan pattern because the fast scan deflection of the laser beam or beams vectorially sums with the process direction motion of the photoreceptor. While the following description describes features of a single beam/single scan spot ROS for the sake of simplification, it is understood that the present invention also applies to printers and other display means that employ single beam or multi-beam ROSs, image bars, or other image writing devices.

Referring to FIG. 1, there is illustrated a more or less conventionally configured optical system 10 of a xerographic print engine (not shown) with which the present invention may be employed. The flying spot ROS scans a data modulated light beam 12 over a xerographic photoreceptor 14 in accordance with a predetermined raster scanning pattern. To that end, the ROS comprises a laser diode 16 for emitting the light beam 12 in the visible or invisible (e.g., infrared) band of the spectrum, together with a polygon 18 that has a plurality of nearly identical, mirror-like exterior sidewalls or "facets" 20.

Also a part of system 10 is a motor 22 for rotating the polygon 18 about its central axis, as indicated by the arrow 24, at a substantially constant angular velocity. The polygon 18 is optically aligned between the laser 16 and the photoreceptor 14, so its rotation causes the laser beam 12 to be intercepted and reflected from one after another of the polygon facets 20, with the result being that beam 12 is cyclically swept across the photoreceptor 14 in a fast scan direction. The photoreceptor 14, on the other hand, is advanced (by means not shown) simultaneously in a generally orthogonal, process direction at a substantially constant linear velocity, as indicated by the arrow 26, so the laser beam 12 scans the photoresponsive surface 14 in accordance with a raster scan pattern. As shown, the photoresponsive surface 14 is coated on a rotating drum 28, but it will be apparent that it also could be carried by a belt or any other suitable substrate.

Typically, the ROS also includes pre-scan optics 30 and post-scan optics 32 for bringing the laser beam 12 to a generally circular focus proximate the photoresponsive surface 14 and for providing any optical correction that may be needed to compensate for scanner wobble and other optical irregularities. Preferably, the optical aperture of the ROS is sufficiently large to avoid excessive truncation of the laser beam 12 because the beam 12 then comes to a generally circular or elliptical focus with a gaussian intensity profile. However, the broader aspects of the instant invention are not limited to any specific scan spot geometry or intensity profile.

The amplitude, duty cycle, and/or pulse width of the laser beam 12 is preferably modulated (collectively referred to herein as "intensity modulation") in accordance with successive multi-bit digital data values. These data values are clocked out of a data source 36 serially in response to data clock pulses that are time synchronized with the scan of the scan spot from bitmap location to bitmap location within the raster scan pattern. Thus, the data clock frequency can be selected (by means not shown) to map the data onto the raster scan pattern at any desired magnification, using either the same or different magnifications in the fast scan and the process directions. The data may be preprocessed in accordance with aspects of the instant invention as will be described herein for the printing of halftoned images, graphics and/or text and other types of line art, so that the data source 36 generically represents any suitable source of raster data for intensity modulating the laser beam 12. In one embodiment, the drive current for the laser diode 16 is serially modulated by modulator 38 in accordance with the data values that are clocked out of the data source 36, thereby intensity modulating the laser beam 12 at the data clock rate in accordance with those data values.

The fast scan positioning precision of the print engine 10 can be increased, if desired, by dynamically adjusting the frequency of the data clock to compensate for positioning errors that tend to be caused by, for example, variations in the angular velocity of the polygon 18 and facets 20, and localized variations in the geometric relationship of the polygon 18 to spatially distinct segments of any given scan line. In addition, the clock may be used to control signals to the laser at a rate that yields spatial addressing of the scan spot at intervals finer than the spot itself. One key application of this high addressability is the precise positioning of edges in a written image.

Alternatively, the present invention may find particular use in various image enhancement systems, for example, the resolution enhancement system described by Lin et al. in U.S. patent application Ser. No. 08/540,998 for a Method and Apparatus for the Resolution Enhancement of Gray-Scale Images that Include Text and Line Art, filed Oct. 11, 1995, and hereby incorporated by reference for its teachings.

Figure 2:
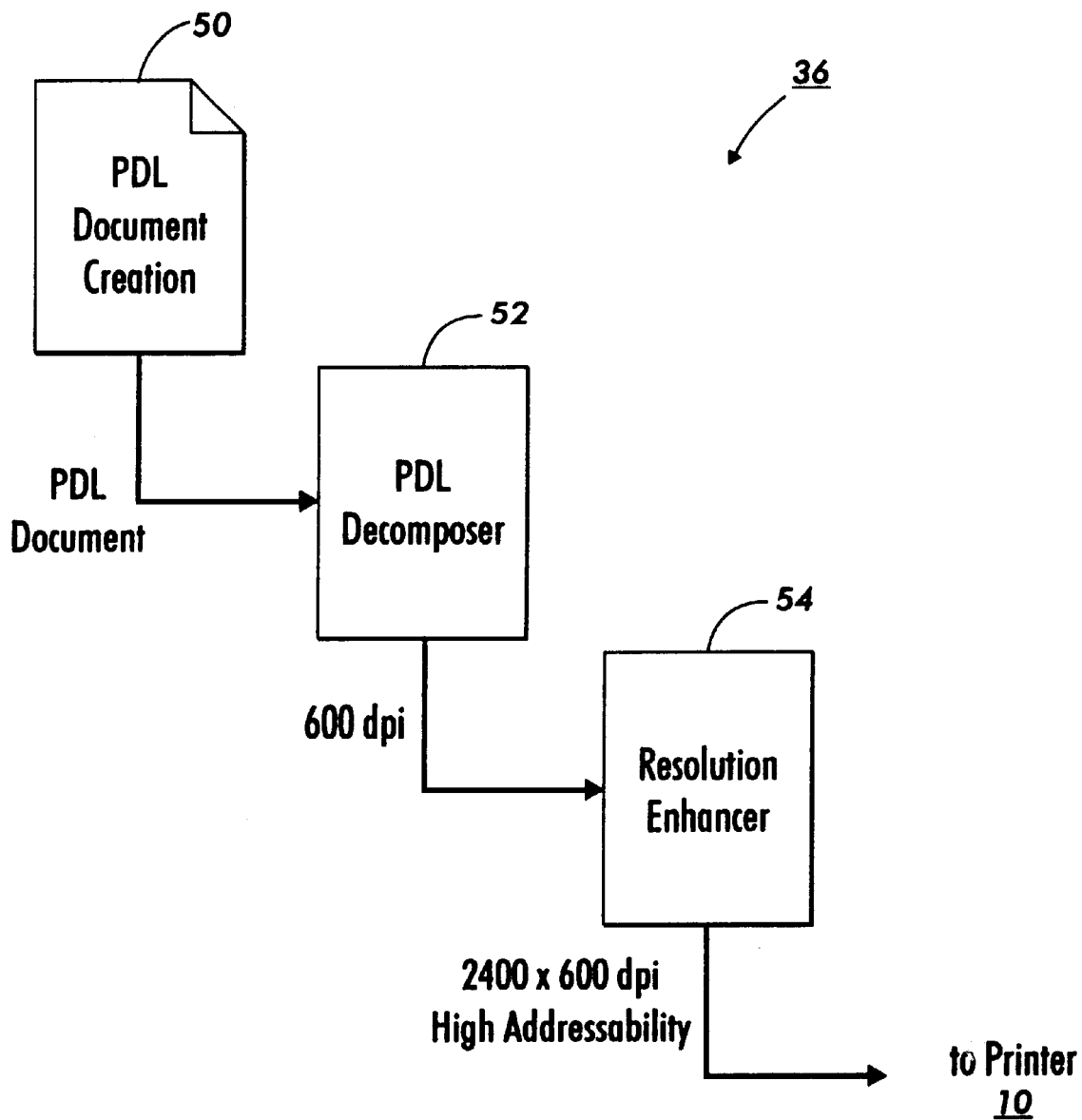
FIG. 2 is a block diagram depicting elements of the data source shown in FIG. 1.

Turning now to FIG. 2, displayed therein is a block diagram illustrating the components of the data source 36 shown in FIG. 1. It will be appreciated by those skilled in the art that numerous sources of data, including image input devices (e.g., scanners), mass storage and networks (local, intranet and internet) may be employed to provide a digital document in a page description language (PDL). Examples of PDLs include Interpress, PCL, and Postscript, although documents represented by other PDLs or other formats are intended to be included as well. Once a PDL document 50 is received by a printing system and stored in memory associated therewith, the document is typically decomposed or decompressed by a decomposer 52 to generate a digital image of at least a portion of the document.

Output of the PDL decomposer 52 is a bitmap image at a particular resolution, for example, 600×600×1. However, in order to drive the high-addressability, systems for which the present invention is intended, the decomposer output is preferably further processed at resolution enhancer 54, where the digital image data is increased in resolution in at least one dimension. In one embodiment, to produce output suitable for driving a high-addressability printing system requiring four bits per pixel of image data, the resolution enhancer would be employed to convert the PDL decomposer output from 600×600×1 to 2400×600×1 (i.e., 600×600×4) as depicted in FIG. 2. It will be appreciated that other enhanced resolutions and enhanced pixel signals are possible, and that the examples employed herein with respect to resolutions are not intended to in any way limit the invention. As described above, the enhanced resolution digital data would then be employed to control, on a sub-pixel or high-addressability basis, the modulation of the laser light source so as to render a resolution enhanced output.

Figure 3:
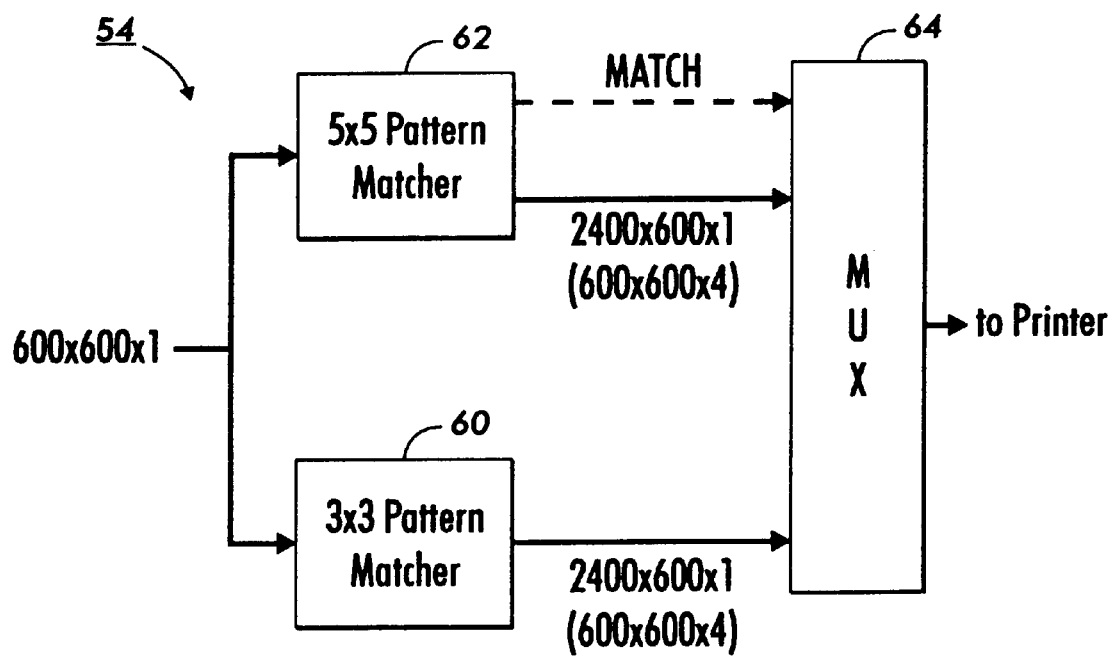
FIGS. 3 and 4 are illustrative embodiments of the hierarchical templatematching design for resolution enhancement in accordance with the present invention.
Figure 4:
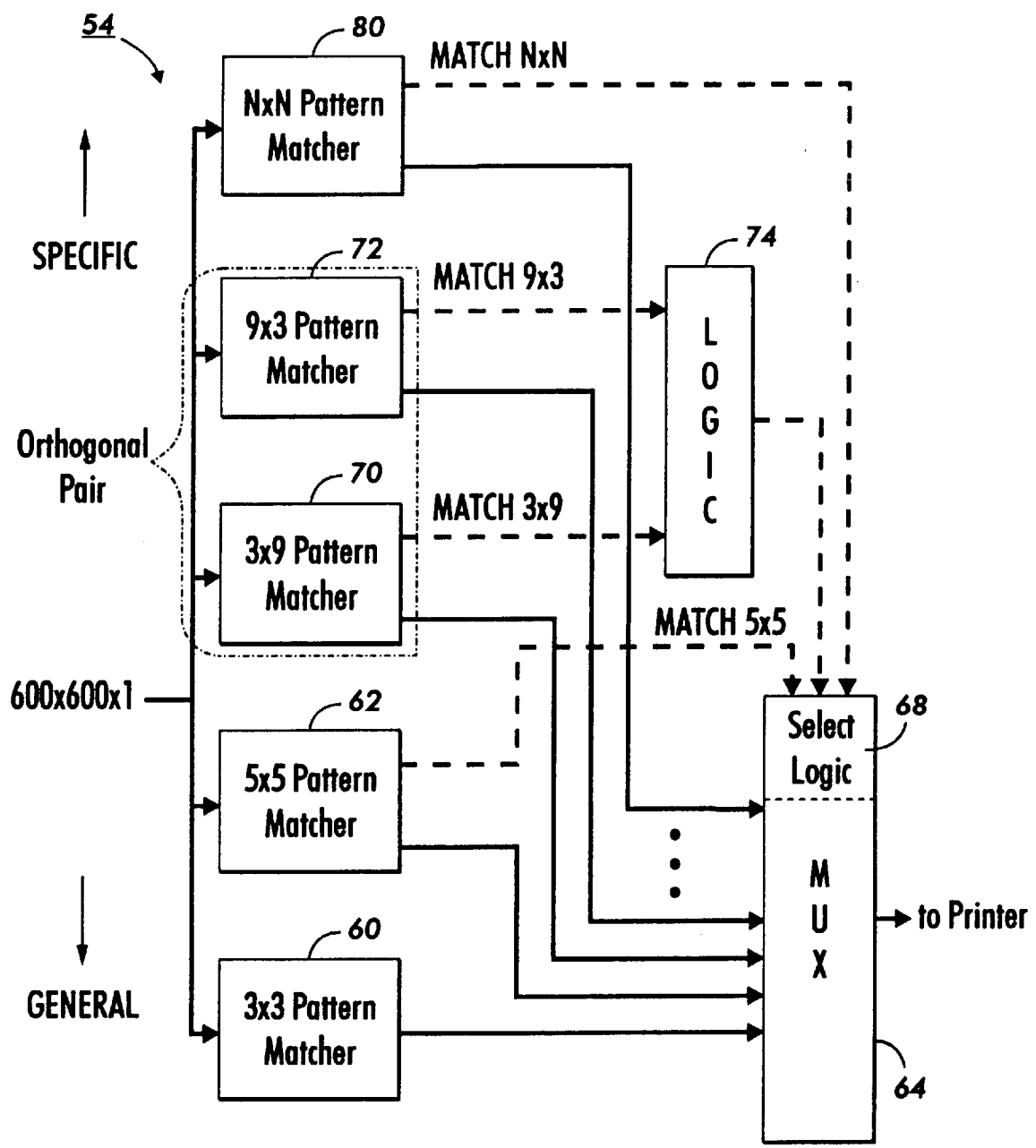

Having described the general embodiment for the present invention, attention is now turned to FIGS. 3 and 4, which depict in more detail, various aspects of the template-matching resolution enhancement architecture employed with respect to the instant invention. FIG. 3 is an exemplary block diagram illustrating the hierarchical nature of the resolution enhancer. Upon receiving input data at a first resolution, the data is passed to a pair of template or pattern matching filters 60 and 62. In a preferred embodiment, the hierarchical pattern matchers would be implemented in parallel with one another as depicted in FIGS. 3 and 4 so as to maintain the performance of the resolution enhancement architecture.

In pattern matching filters 60 and 62, data for a plurality of pixels located about a central pixel is compared to predefined patterns to identify a match. Whenever a match is detected, the pattern matchers output a resolution enhanced set of pixels or enhanced pixel signal for the central and surrounding pixels. However, in order to avoid the possibility of contention whenever both of the pattern matching filters within matchers 60 and 62 detect similar patterns, a hierarchical system is required. The system employed herein is one that gives preference to the larger, more specific pattern matching filters—in this example the 5×5 pattern matcher—using a multiplexer 64 controlled via a select line that indicates a match in the larger pattern matcher block.

Figure 5:
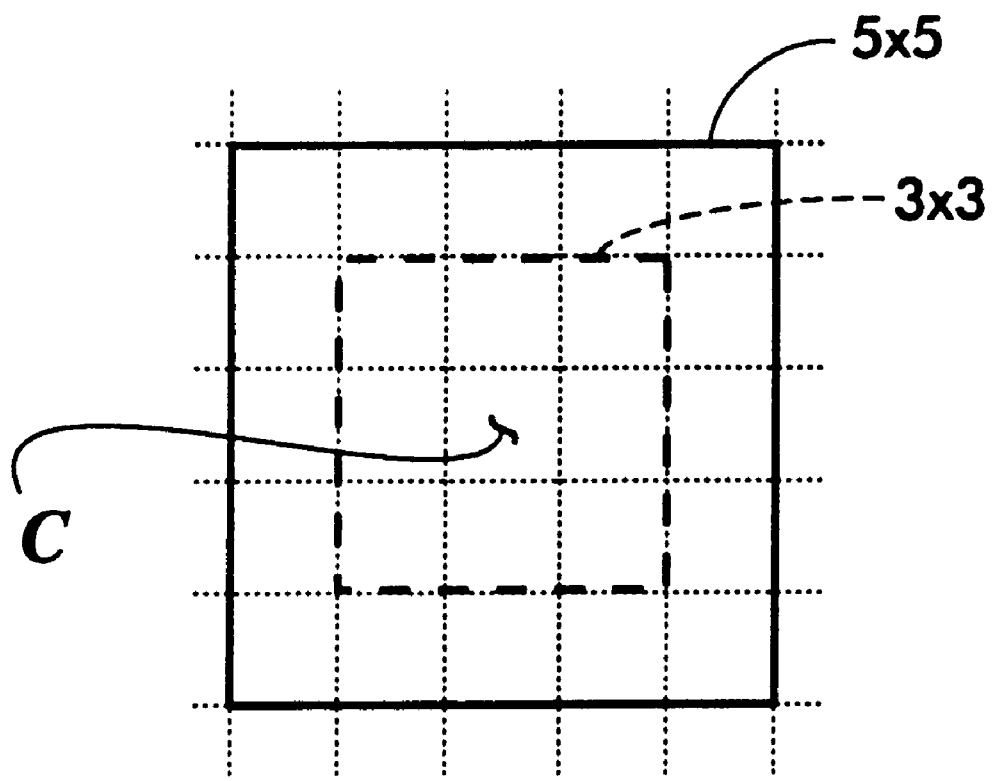
FIG. 5 is an exemplary illustration of two template windows as employed by the present invention.
Figure 6:
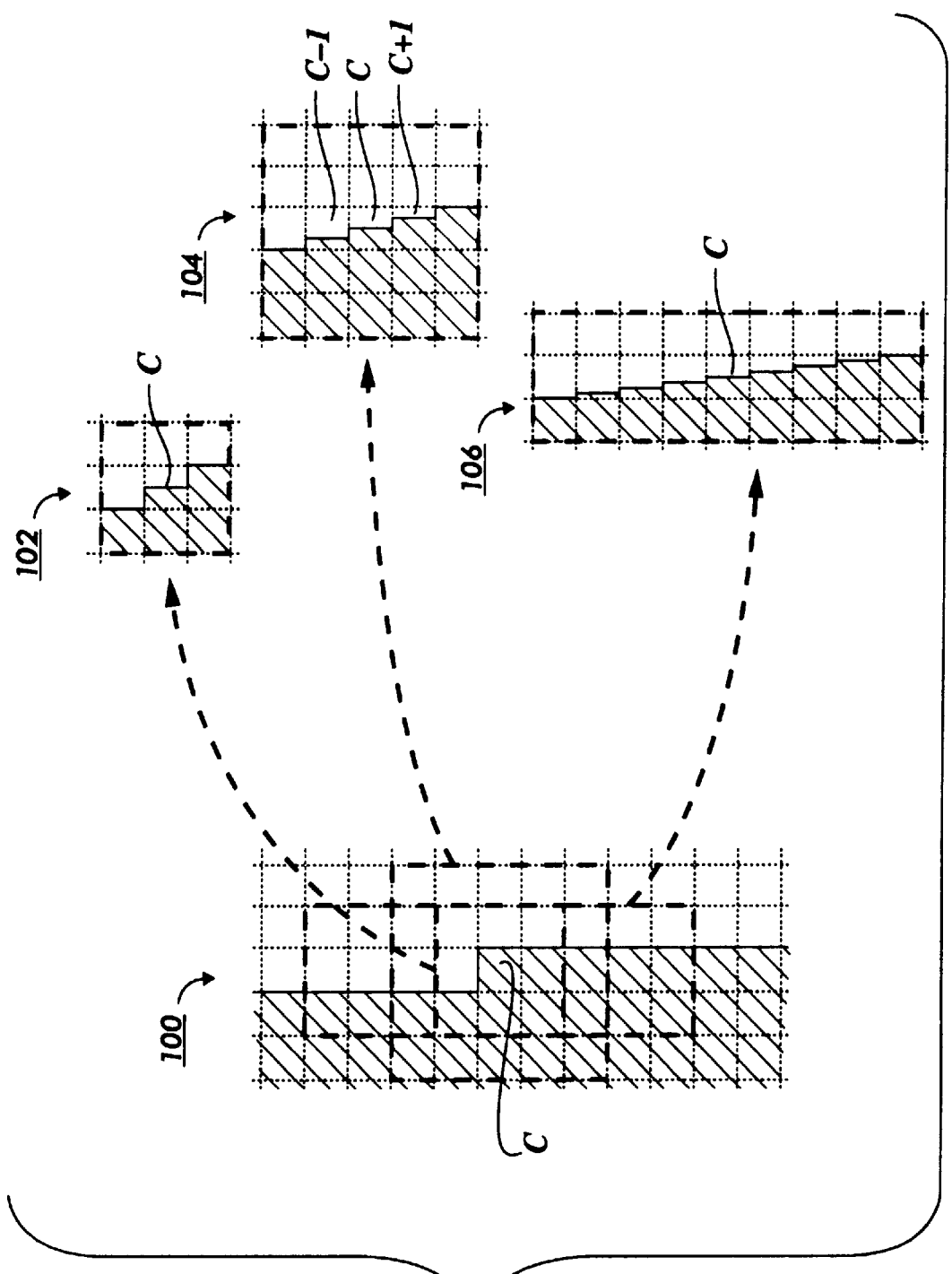
FIG. 6 is an exemplary illustration of various image segments representing the outcome of various operations carried out in accordance with the present invention.

In order to further illustrate the operation of the hierarchical pattern-matching system of FIG. 3, attention is briefly turned to FIGS. 5 and 6, where bitmap examples are depicted. In FIG. 5, the 3×3 and 5×5 pattern windows are superimposed on one another; both centered about the central pixel C. As will be appreciated by those skilled in the art, the 5×5 window contains significantly more image context than the smaller window. The additional information of the larger window allows for a better estimate of the slope of an observed edge. Once the slope is estimated, highly addressable signals are generated that are appropriate for enhancing the image to appear with the correct slope and without jagged transitions. A better estimate of the slope will yield a better appearing enhancement. The slope estimation is implicit to the template design procedure. However, it is also known that the storage requirements for all possible patterns in the 5×5 window is significantly greater, $2^{25}$ for the latter versus $2^9$ for the former. Thus, the present invention would employ the 5×5 patterns only where necessary to add context to the smaller set of 3×3 patterns.

An illustrative example is found in FIG. 6. There, given an input bitmap 100, with a central pixel C happening to fall at a transition along the vertical contour or edge, image enhancement would be desirable to smooth the transition. In particular, it would be desirable to accomplish the transition along the vertical contour over a number of pixels, as illustrated for example in image segment 102. Segment 102, processed in accordance with the 3×3 pattern match, would have identified the transition correctly and would compensate by reducing the exposure for central pixel. C to approximately one-half the level of an exposed pixel. This would obviously result in a smoother transition. However, when compared to the enhancement that would have resulted if the 5×5 pattern match were employed to control the transition, bitmap 104, it is apparent that the transition should be spread over an even larger vertical range of pixels (e.g., pixels $C_{-1}$, C, $C_{+1}$).

Recognizing that the 5×5 pattern matcher would produce the preferred output whenever a relevant pattern is identified, the hierarchical relationship is established. As illustrated in FIG. 3, pattern matcher 62 not only outputs the enhanced pixel data generated in response to a recognized pattern, but a signal indicating that a match was present as well. The match signal can then be employed as a select signal in the 2 input multiplexer 64 to select the 5×5 output whenever there is a match.

The pattern-matching design of FIG. 3 does not require that the 5×5 pattern matcher contain all $2^{25}$ possible patterns as a number of the patterns would be duplicative of those that would be recognized and treated appropriately by the 3×3 pattern matcher. Thus, pattern matcher 62 can be optimized, using statistical techniques as described by Loce et al. in U.S. Pat. No. 5,359,423 and U.S. Pat. No. 5,387,985 so as to reduce the number of patterns to be recognized, thereby further reducing the pattern storage requirements of such a system.

An alternative embodiment of resolution enhancer 54 is depicted in FIG. 4. There, additional hierarchical pattern matchers are depicted so as to further expand the ability to recognize and enhance particular patterns within the input image. For example, an orthogonal pair of template-matchers 70 and 72 have been added to the device depicted in FIG. 3. The 3×9 and 9×3 pattern matchers are particularly useful in identifying longer horizontal and vertical contour transitions, for example, as illustrated by bitmap 106 in FIG. 6. The present invention further encompasses alternative embodiments employing a number of other filter dimensions as represented by NxN pattern matcher 80. Possible additional or alternative pattern matchers include, 7×7, 9×9, 7×3, 3×7, 7×5, 5×7, 9×5 and 5×9. As illustrated in FIG. 4, each of the pattern matchers would generate not only an enhanced output. pixels in response to a match, but a match signal as well. The match signals of an orthogonally paired pattern matcher are preferably mutually exclusive and may be combined by a simple logic circuit 74 so that only a single match signal is generated by the pair. For example, a preferred set may be 3×3, (5×3, 3×5), (7×3, 3×7), (9×3, 3×9)

As a result of the additional pattern matchers, it is necessary to add selection control logic 68 to multiplexer 64. Selection control logic 68 is pre-programmed to reflect the hierarchy of the template-matching filters. In a preferred embodiment, the hierarchy of the selection logic would place enhancement by the more specific filters at a higher level, and the more general filters at a lower level. For example, the 9×3 or 3×9 pattern matchers would be selected over the orthogonal pairs 7×3, 3×7 and 5×3, 3×5, and over the smaller square windows 3×3, 5×5 or 7×7 pattern matcher. In a preferred embodiment, the pattern matchers, as depicted, operate in parallel so as to concurrently generate enhanced output in response to a common central pixel. Moreover, the system preferably operates at or above a data rate sufficient to provide the enhanced image data to printing system 10 at its processing speed.

In recapitulation, the present invention is a method and apparatus for enhancing the contour fidelity of an image represented by a plurality of pixels, by storing pixel values representing a segment of the image in memory; isolating a plurality of regions of the pixels of said image segment to form a plurality of windows including a central pixel and a plurality of pixels surrounding said central pixel. Then comparing at least two of the regions of pixels within the windows with a set of standard pixel patterns for each of the windows and identifying matching pixel patterns within each of the windows. When matching patterns are identified, enhancing one or more pixels located at a correctable position when the central pixel is located at a correctable position in a plurality of the windows wherein the enhancement is accomplished in accordance with an enhancement associated with one of the windows and wherein the enhancement is determined in accordance with a predetermined hierarchy for the windows.

To better understand the scope of the present hierarchical filtering method, we note that pattern matching is not restricted to binary images. Gray-scale pattern matching and patterning matching in color imagery is also comprehended by the present invention. We also note that the meaning of "pattern match" is not restricted to an ideal one-to-one correspondence. Rather, it refers to matching to a significant degree as determined by some decision making criterion, as is understood in the fields of image region classification, statistical decision making, and others.

It is, therefore, apparent that there has been provided, in accordance with the present invention, a method and apparatus for enhancing the contour fidelity of an image. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method of enhancing an image represented by a plurality of pixels, comprising the steps of:

obtaining pixel values representing a segment of the image;

isolating a plurality of regions of the pixels of said image segment to form a plurality of windows, a first window having dimension N×N, a second window having dimension A×B where A>=N and B>=N, and wherein B does not equal A, and a third window of dimension B×A orthogonal to said second window wherein overlapping regions of said windows are centered about a central pixel and a plurality of pixels surrounding said central pixel;

comparing, in an heirarchical manner, at least two of the regions of pixels within said windows with a set of standard pixel patterns for each of the windows;

identifying matching pixel patterns within each of the windows; and enhancing the central pixel when the central pixel is located at a correctable position in only one of the windows, and enhancing the central pixel when the central pixel is located at a correctable position in a plurality of the windows wherein the enhancement is accomplished in accordance with an enhancement associated with one of the windows.

2. The apparatus of claim 1, wherein the predetermined hierarchy for enhancement of the central pixel within the windows is in order of specific pixel patterns to general pixel patterns and where the general pixel patterns are represented by windows that are smaller than the windows associated with specific pixel patterns.

3. The method of claim 1, wherein the enhancement step is applied to the central pixel and at least one neighboring pixel.

4. The method of claim 3, wherein the enhancement step results in the enhancement of a plurality of pixels surrounding the central pixel.

5. The method of claim 1, wherein the pixel values are multilevel values representing at least one color of the image.

6. An apparatus for enhancing an obtained image represented by a plurality of pixels, comprising:

means for storing pixel values representing a segment of the obtained image;

a plurality of windows for isolating a plurality of regions of the pixels of said image segment, with a first window having dimension N×N, a second window having dimension A×B where A>=N and B>=N, and wherein B does not equal A, and a third window of dimension B×A orthogonal to said second window wherein overlapping regions of said windows are centered about a central pixel and a plurality of pixels surrounding said central pixel;

a plurality of pattern matchers for comparing, in an heirarchical manner, at least two of the regions of pixels within the windows with a set of standard pixel patterns for each of the windows and signaling the presence of matching pixel patterns within each of the windows; and said pattern matchers enhancing at least one output pixel when the output pixel is located at a correctable position in only one of the windows, and enhancing the output pixel when the output pixel is located at a correctable position in a plurality of the windows wherein the enhancement is accomplished in accordance with an enhancement associated with one of the windows.

7. The apparatus of claim 6, wherein the predetermined hierarchy for enhancement of the central pixel within the windows is in order of specific pixel patterns to general pixel patterns and where the general pixel patterns are represented by windows that are smaller than the windows associated with specific pixel patterns.

8. The apparatus of claim 6, wherein the central pixel and at least one neighboring pixel are altered as a result of the enhancement by the pattern matchers.

9. The apparatus of claim 8, wherein the enhancement results in the enhancement of a plurality of pixels surrounding the central pixel.

* * * * *